US010306649B2

(12) United States Patent
Comstock

(10) Patent No.: US 10,306,649 B2
(45) Date of Patent: *May 28, 2019

(54) METHODS FOR IDENTIFYING MOBILE STATIONS THAT ARE NEAR NEIGHBOR CELLS

(71) Applicant: Kyocera Corporation, Kyoto (JP)

(72) Inventor: David Comstock, San Diego, CA (US)

(73) Assignee: Kyocera Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/821,400

(22) Filed: Nov. 22, 2017

(65) Prior Publication Data

US 2018/0098328 A1 Apr. 5, 2018

Related U.S. Application Data

(63) Continuation of application No. 15/112,402, filed as application No. PCT/US2015/013944 on Jan. 30, 2015, now Pat. No. 9,877,329.

(Continued)

(51) Int. Cl.
| | |
|---|---|
| *H04W 72/00* | (2009.01) |
| *H04W 72/04* | (2009.01) |
| *H04W 24/08* | (2009.01) |
| *H04W 24/10* | (2009.01) |
| *H04W 24/04* | (2009.01) |

(Continued)

(52) U.S. Cl.
CPC ....... *H04W 72/0486* (2013.01); *H04L 5/0048* (2013.01); *H04W 24/04* (2013.01); *H04W 24/08* (2013.01); *H04W 24/10* (2013.01); *H04W 52/0206* (2013.01); *H04W 72/0413* (2013.01);

(Continued)

(58) Field of Classification Search
CPC ................................................ H04W 72/0486
See application file for complete search history.

(56) References Cited

U.S. PATENT DOCUMENTS

| | | | |
|---|---|---|---|
| 2010/0093363 A1 | 4/2010 | Malladi | |
| 2011/0014940 A1 | 1/2011 | Zhang et al. | |

(Continued)

FOREIGN PATENT DOCUMENTS

| | | |
|---|---|---|
| WO | WO 2012-149968 | 11/2012 |
| WO | WO 2013-044957 | 4/2013 |
| WO | WO 2013-049505 | 4/2013 |

OTHER PUBLICATIONS

Fiberhome Technologies Group; "Small cell discovery in HetNet based on existed uplink signal"; R2-132295, 3GPP TSG-RAN WG2 #83; Barcelona, Spain; Aug. 6, 2013.

(Continued)

*Primary Examiner* — Gerald A Smarth

(57) ABSTRACT

Uplink signals transmitted from each of a plurality of UE devices being served by a serving eNB are received at a neighbor cell eNB. Information regarding the uplink signals received by the neighbor cell eNB is then sent to the serving eNB. The UE devices are identified based on the information. An aggregate load level of the UE devices is determined based on resource load requirements of each UE device. In some instances, it is determined which of a plurality of deactivated neighbor cells should be activated based on load levels associated with one or more UE devices that are determined to be near each of the plurality of deactivated neighbor cells.

19 Claims, 3 Drawing Sheets

Related U.S. Application Data

(60) Provisional application No. 61/934,403, filed on Jan. 31, 2014.

(51) Int. Cl.
  H04L 5/00  (2006.01)
  H04W 74/08  (2009.01)
  H04W 52/02  (2009.01)

(52) U.S. Cl.
  CPC ......... H04W 74/08 (2013.01); *Y02D 70/1262* (2018.01)

(56) References Cited

U.S. PATENT DOCUMENTS

| | | | |
|---|---|---|---|
| 2011/0039574 A1* | 2/2011 | Charbit | G01S 5/0215 455/456.1 |
| 2012/0275389 A1 | 11/2012 | Kubota et al. | |
| 2013/0045693 A1* | 2/2013 | Chen | H04W 24/10 455/67.13 |
| 2013/0244718 A1* | 9/2013 | Lee | H04W 36/0083 455/525 |
| 2013/0252660 A1 | 9/2013 | Bach | |
| 2013/0329612 A1* | 12/2013 | Seo | H04J 11/0056 370/280 |
| 2014/0120967 A1* | 5/2014 | Purnadi | H04W 72/1226 455/501 |
| 2014/0177485 A1* | 6/2014 | Wang | H04L 1/00 370/280 |
| 2017/0188404 A1 | 6/2017 | Fodor et al. | |

OTHER PUBLICATIONS

Samsung; "Small cell discovery for efficient small cell operation"; R1-131030, 3GPP TSG-RAN WG1#72bis meeting; Chicago, USA; Apr. 5, 2013.

Kyocera Corp; "UE proximity detection for ES cell activation for overlaid scenario"; R3-132299, 3GPP TSG RAN WG3 Meeting #82; San Francisco, USA; Nov. 11-15, 2013.

Kyocera Corp; "PRACH-based UE proximity detection for ES overlaid coverage scenario"; R3-140756, 3GPP TSG RAN WG3 Meeting #83-bis; San Jose del Cabo, Mexico; Mar. 22, 2014.

* cited by examiner

METHODS FOR IDENTIFYING MOBILE STATIONS THAT ARE NEAR NEIGHBOR CELLS

CLAIM OF PRIORITY

The present application is a continuation of and claims priority to U.S. application Ser. No. 15/112,402, entitled "METHODS FOR IDENTIFYING MOBILE STATIONS THAT ARE NEAR NEIGHBOR CELLS"; which is a national stage application of PCT/US2015/013944, entitled "METHODS FOR IDENTIFYING MOBILE STATIONS THAT ARE NEAR NEIGHBOR CELLS", filed Jan. 30, 2015; which claims priority to Provisional Application No. 61/934,403, entitled "Methods for Identifying Mobile Stations that are Near Neighbor Cells for Load Sharing", filed Jan. 31, 2014; all assigned to the assignee hereof and hereby expressly incorporated by reference in their entirety.

FIELD

The invention disclosed herein generally relates to wireless communications and more particularly to apparatuses, systems, and methods for identifying mobile stations that are near neighbor cells for load sharing.

BACKGROUND

Many wireless communication systems employ transceiver stations or radio heads to provide service within geographical service areas, where the boundaries of a service area are determined by the radio coverage of its associated transceiver station. Wireless service is provided to user equipment (UE) devices over radio frequency carriers (carriers) within each service area, where a carrier is the modulated waveform that conveys the physical channels as specified by the associated wireless technology standard. These service areas are sometimes referred to as "cells".

Although the term "cell" sometimes refers to the geographical area where multiple uplink and downlink resources (e.g., pairs of uplink and downlink carriers) are used, increasingly the term "cell" is used to refer to the geographical service area where a single uplink resource and a single downlink resource are used to communicate with the UE devices. For example, where Time Division Duplex (TDD) is used, a single frequency channel is used within the cell and uplink and downlink channels are allocated different time periods. Where Frequency Division Duplex (FDD) is used, a single uplink/downlink frequency channel pair (one uplink frequency channel and one downlink frequency channel) is used within a "cell".

As discussed herein, one or more resources (carrier pairs) may be used in a service area. As a result, a service area may be a single cell or may contain multiple cells. In one common arrangement, each service area is adjacent to several other service areas to provide ubiquitous coverage over a large geographical area.

In some systems, when capacity requirements are lower, a communication station may be deactivated, such it is not capable of providing wireless service, and, when capacity requirements are higher, the communication station may be activated and begin providing wireless service to one or more UE devices that are within its service area. As discussed below, techniques are needed to determine whether a deactivated communication station should be activated.

SUMMARY

In a cellular communication system, when a base station controller, such as a Long-Term Evolution (LTE) Evolved Node B (eNB), is selecting one or more Energy Saving (ES) Cells to activate to relieve high traffic loads in other cells (e.g., a Coverage Cell), activating ES Cell(s) that are nearest to groups of user equipment (UE) devices that are using the largest number of resources would provide the largest offloading gains and would make the most efficient use of the ES Cells. For purposes of illustration, the feature to determine which ES Cells could relieve the Coverage Cell of the largest load of UE resources may be referred to as "UE proximity detection."

In operation, the UE proximity detection begins by receiving, at a first neighbor cell eNB, an uplink signal transmitted from at least one of the UE devices being served by a serving eNB. Information is then sent to the serving eNB. The information pertains to the uplink signal received by the first neighbor cell eNB. Based on the information, one or more of the UE devices are identified. An aggregate load level of the UE devices that are near the first neighbor cell eNB is determined based on resource load requirements of each UE device. In some instances, it is determined which of a plurality of deactivated neighbor cells should be activated based on load levels associated with one or more UE devices that are determined to be near each of the plurality of deactivated neighbor cells.

DETAILED DESCRIPTION

Wireless communication systems can employ various energy savings features that enable the reduction of the amount of energy used during the operation of a wireless network. One means for reducing energy consumption in a network is to deploy capacity-boosting cells that are activated and deactivated according to the current data traffic demands. Deactivated cells switch off the functions that consume the most energy, such as the radio transmitter. The capacity-boosting cells may be referred to as Energy Saving (ES) Cells for purposes of illustration.

When a base station controller, such as a Long-Term Evolution (LTE) Evolved Node B (eNB), is selecting one or more ES cells to activate to relieve high traffic loads in other cells, activating ES Cell(s) that are nearest to groups of user equipment (UE) devices that are using the largest number of resources would provide the largest offloading gains and would make the most efficient use of the ES Cells. For purposes of illustration, the feature to determine which ES Cells could relieve the Coverage Cell of the largest load of UE resources may be referred to as "UE proximity detection."

Figure 1:
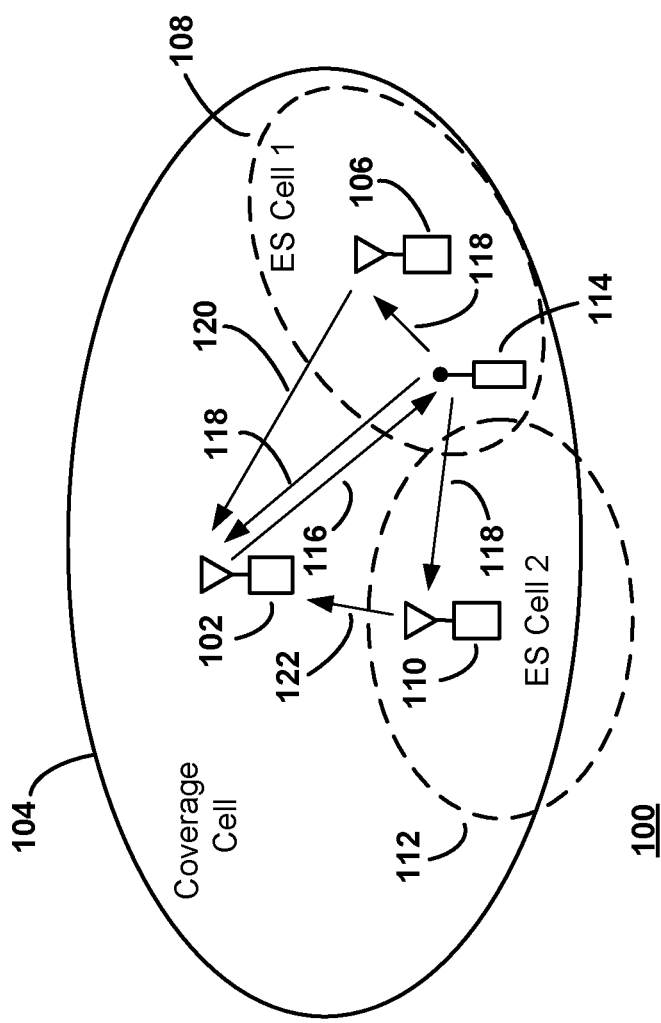
FIG. 1 is an illustration of a cellular communication system according to the invention.

FIG. 1 is an illustration of a cellular communication system 100, according to the invention, in which the serving eNB 102 provides a Coverage Cell 104. The Coverage Cell 104 provides radio coverage for the entire coverage cell area. The serving eNB 102 provides wireless service within a geographical service area, a portion of which is shown by Coverage Cell 104. Although the serving eNB 102 is shown as only providing one cell, it should be understood that, in other instances, serving eNB 102 can provide additional cells besides the Coverage Cell 104.

The cellular communication system 100 also includes two deactivated neighbor cell eNBs (e.g., ES Cells). As discussed herein, a neighbor cell is "deactivated" when it no longer transmits downlink signals to UE devices. Therefore, a deactivated neighbor cell cannot provide wireless service to UE devices. The neighbor cell eNB that provides the neighbor cell still includes active functions and is not turned off. For example, the neighbor cell eNB is still capable of communicating with other eNBs and/or the network and may still be capable of receiving signals transmitted by UEs.

When activated, each of the eNBs transmits and receives wireless signals to provide the cells 104, 108, 112, respectively. Each eNB, which also may be referred to as an access node, access point, eNodeB, base station, and other terms, includes a transceiver, or radio head and station controller. The controller in each eNB is configured to perform the various methods and operations described herein. The transceiver, or radio head, may be collocated with the controller although the controller may be physically separated from the radio head.

The radio head at least includes radio frequency (RF) transceiver equipment such as antennas, transmitters, and receivers, for transmitting and receiving wireless signals. Typically, radio heads do not include higher level processing and control functions which are performed by the associated controller. For the illustration of FIG. 1, the radio heads are near a controller where both the radio head and the controller may be implemented within a single apparatus. Since the location, shape, and size of the cell is determined at least in part by wireless transmission and reception with the eNB, the cell's location and coverage area is determined by the location and operation of the radio head.

When activated, the first neighbor cell eNB 106 provides wireless service within a geographical service area, a portion of which is shown by the first neighbor cell 108 (e.g., ES Cell 1). Likewise, when activated, the second neighbor cell eNB 110 provides wireless service within a geographical service area, a portion of which is shown by the second neighbor cell 112 (e.g., ES Cell 2). Similar to the serving eNB 102, each of the neighbor cell eNBs are shown as only providing one cell, even though each of the neighbor cell eNBs are capable of providing additional cells besides their respective ES Cells shown in FIG. 1. The boundaries of the first neighbor cell 108 and the second neighbor cell 112 are shown as dashed lines in FIG. 1 to indicate that both of these cells are currently deactivated. However, the ES cells (e.g., ES Cell 1 and ES Cell 2) located within the coverage area of the Coverage Cell 104 may be subsequently activated to boost the traffic capacity for this area.

As mentioned above, each of the eNBs typically provide several cells, but in the interest of brevity and clarity, each of the activated eNBs in cellular communication system 100 provide one cell, and the full radio and data processing capacity of each activated eNB is applied to the service of the cell they respectively provide. Accordingly, for the example shown in FIG. 1, the available capacity of a cell is equivalent to the available capacity of the eNB that provides the cell. As discussed herein, an eNB includes the equipment such as a controller and radio head that provides a single cell. Accordingly, an eNB can be configured or adjusted to establish the size and shape of the service area of the cell.

Several eNBs are typically interconnected through a backhaul (not shown) to a mobile network (not shown) to provide several service areas to cover large areas. Interconnected eNBs may exchange signaling messages to perform operational procedures of the mobile network. For example, one eNB may send a signaling message over a backhaul to request a second eNB to activate an ES cell. For another example, one eNB may send a signaling message over a backhaul to send information to a second eNB, such as information 120 in FIG. 1 that is sent by eNB 106 to eNB 102 and provides information about uplink signal 118 that has been received by eNB 106. The backhaul may include any combination of wired, optical, and/or wireless communication channels. The mobile network may include routing and processing electronic equipment for connecting communication stations and for transporting data to other networks, such as the Internet or the public telephone network.

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification. In addition, for the examples herein, the network may include 3GPP Core Network functionality of the Mobility Management Entity (MME) and the Packet Gateway (P-GW).

For the examples herein, the serving eNB 102 includes a wireless transceiver that transmits downlink signals 116 to one or more UE devices 114 within the Coverage Cell 104 in accordance with 3GPP LTE and receives uplink signals 118 from the one or more UE devices 114 within the Coverage Cell 104 in accordance with 3GPP LTE. The first neighbor cell eNB 106 includes a wireless transceiver that is capable of receiving uplink signals 118 from the one or more UE devices 114 within the ES Cell 1 108 in accordance with 3GPP LTE, and once activated, the wireless transceiver of the first neighbor cell eNB 106 is also capable of transmitting downlink signals to the one or more UE devices 114 within the ES Cell 1 108 in accordance with 3GPP LTE. Similarly, the second neighbor cell eNB 110 includes a wireless transceiver that is capable of receiving uplink signals 118 from the one or more UE devices 114 in accordance with 3GPP LTE, and once activated, the wireless transceiver of the second neighbor cell eNB 110 is also capable of transmitting downlink signals to the one or more UE devices 114 in accordance with 3GPP LTE.

The elliptical shapes representing the service areas of the cells generally illustrate the relationships between the cells and do not necessarily depict the actual shapes of the service areas. The cells may have any of several shapes and sizes. In FIG. 1, a particular energy savings cell configuration is shown in which the Coverage Cell 104 and the ES Cells substantially overlap, which illustrates a typical operating scenario where UE devices are able to detect at least two cells at the same time and that allows UE devices to handover to a cell before losing connection with its serving cell. In some instances, an energy savings cell configuration could be used in which one or more ES Cells (e.g., ES Cell 1) are located entirely within the Coverage Cell 104. Likewise, an energy savings cell configuration could be used in which one or more ES Cells (e.g., ES Cell 2) only partially overlap with the Coverage Cell 104.

FIG. 1 also shows a UE device 114 (e.g., an LTE UE device), which represents a resource-intensive group of UEs that are being served by the Coverage Cell 104. The User Equipment (UE) devices 114 may be referred to as mobile devices, wireless devices, wireless communication devices, and mobile wireless devices, and UEs, as well as by other terms. The wireless communication devices include electronics and code for communicating with communication stations (eNBs) and, in some cases, with other devices including other UE devices. The UE devices include devices such as smart phones, cell phones, personal digital assistants (PDAs), wireless modem cards, wireless modems, televisions with wireless communication electronics, and laptop and desktop computers, as well as other devices. The combination of wireless communication electronics with an electronic device, therefore, may form a wireless communication device. For example, a wireless communication device may include a wireless modem connected to an appliance, computer, or television.

In operation, the cellular communication system 100 identifies which ES cells are near a group of UEs with a relatively high traffic load. As used herein, the term "traffic load" generally refers to an amount of communications resources of a particular cell that are being used by the UE devices that are being served by the cell. For the LTE system, communications resource assignments consists of Orthogonal Frequency-Division Multiple Access (OFDMA) resource blocks, which consist of a frequency component, consisting of subchannels, and a time component, consisting of timeslots within time frames and subframes. Traffic load determination considers resource block usage averaged over multiple time frames. Traffic load can be expressed in absolute terms or as a measurement relative to the total resources (e.g., capacity) of the cell or the eNB providing the cell.

In the example shown in FIG. 1, the serving eNB 102 identifies which UE devices 114 being served by the serving eNB 102 are near one or more neighbor cells 108, 112. The first step in this identification process involves the first neighbor cell eNB 106 receiving an uplink signal 118 transmitted from at least one of the UE devices 114. In some instances, the uplink signal 118 received by the first neighbor cell eNB 106 is a Long-Term Evolution (LTE) Sounding Reference Signal (SRS) of the serving eNB 102. In other instances, the uplink signal 118 received by the first neighbor cell eNB 106 is a preamble transmission on an LTE Physical-Layer Random-Access Channel (PRACH) of the serving eNB 102.

After receiving the uplink signal 118, the first neighbor cell eNB 106 sends information 120 to the serving eNB 102. As used herein, the information 120 sent to the serving eNB 102 may also be interchangeably referred to as a report, an information report, or a PRACH report. Although, the information need not be limited to taking the form of a report.

The information 120 pertains to the uplink signal 118 received by the first neighbor cell eNB 106. In some instances, the information 120 includes the PRACH preamble value received by neighbor cell eNB 106. In some instances, the information 120 includes a signal strength measurement value of the uplink signal 118 received at the first neighbor cell eNB 106. In some instances, the serving eNB 102 may receive information 120, 122 from both the first neighbor cell eNB 106 and the second neighbor cell eNB 110, respectively, that pertain to the same UE device 114. If this occurs, the serving eNB 102 can determine which of the first neighbor cell eNB 106 and the second neighbor cell eNB 110 is closer to the UE device 114 based on which signal containing information 120, 122 has a larger signal strength measurement value.

Based on the information 120, the serving eNB 102 identifies one or more of the UE devices 114 that are near the first neighbor cell eNB 106. Identification of a UE device 114 may be based on comparing the PRACH preamble value received by the neighbor cell eNB 106 and the PRACH preamble value assigned to a UE device 114 by the serving eNB for the PRACH transmission. Once the UE devices 114 have been identified, the serving eNB 102 may determine an aggregate load level of the UE devices 114 that are near the first neighbor cell eNB 106 based on resource load requirements of each UE device 114 whose uplink signal 118 was received by the first neighbor cell eNB 106. The serving eNB 102 knows the resource requirements of each of the UE devices 114 that it is serving. Thus, the serving eNB 102 can determine the aggregate load level of the UE devices 114 that are near a particular ES cell (e.g., first neighbor cell 108). In some instances, eNB 102 may determine an area with relatively high traffic load by means other than receiving uplink signal information for many UE devices 114 that it is serving. For example, eNB 102 may select one or more UE devices 114 with high resource usage to transmit the uplink signal used for UE proximity detection in order to limit the number of UE devices that are transmitting the uplink signal for the purpose of UE proximity detection. For another example, eNB 102 may have information by other means that a group of UE devices are near each other and when it receives information about an uplink signal transmission for one of the UE devices in this group, it can estimate the aggregate load for an area around this group of UE devices.

The serving eNB 102 can also determine which of a plurality of deactivated neighbor cells 108, 112 should be activated based on aggregate load levels associated with one or more UE devices 114 that are near each of the plurality of deactivated neighbor cells 108, 112. In the example of FIG. 1, the first neighbor cell 108 (e.g., ES Cell 1) should be activated since the group of UEs (represented by UE device 114) is nearest to this ES cell.

During operation of the UE proximity detection described herein, false detections and the transmission of unnecessary information reports from the neighbor cell eNBs to the serving eNB 102 may occur and care must be taken to filter out these anomalies. For example, when the uplink signal 118 is a preamble transmission on the PRACH of the serving eNB 102, the UE devices 114 are unaware of the neighbor cells 108, 112. Accordingly, the UE devices 114 simply follow the standardized procedure for transmissions on eNB 102's PRACH, and the transmissions are configured for the serving eNB 102 to receive them and the operation is controlled by eNB 102.

When the serving eNB 102 receives the preamble transmissions from the UE devices 114, it responds with a Random Access Response (RAR) message (not shown in FIG. 1) in accordance to the LTE PRACH procedure. If a UE device 114 does not receive a RAR message from the serving eNB 102 within a specified period of time after the preamble transmission, the UE device 114 will transmit the preamble again at a higher transmission power (e.g., power ramping). If the serving eNB 102 does not receive the preamble transmission the first time and it is repeated, it could have a negative impact on the UE proximity detection procedure described above due to false detections and multiple information transmitted from a neighbor cell for the same UE device 114. As illustrated in FIG. 1, UE devices 114 are nearer to neighbor cell eNB 106 than to serving eNB 102. Therefore, eNB 106 may detect and receive an uplink signal transmission from a UE device 114 when serving eNB 102 does not and the UE device 114 will make additional, unnecessary preamble transmissions until the serving eNB 102 detects and receives it and sends the RAR message to UE device 114. Additional preamble transmissions such as these are superfluous once a neighbor cell eNB has received a PRACH transmission because these particular PRACH transmissions are only for UE proximity detection. Also, since the transmission power is increased for each additional preamble transmission, neighbor cell eNBs that are not the nearest, such as neighbor cell eNB 110, may detect and receive the preamble transmission and send related information to serving cell eNB 102. This would be a false detection since it is not the nearest neighbor cell. Therefore, this procedure could result in multiple PRACH reports being sent from the same neighbor cell eNB for the same UE device 114. Also, it could result in false detection of the UE device 114 by ES Cells that are not nearest to the UE device 114.

Figure 2:
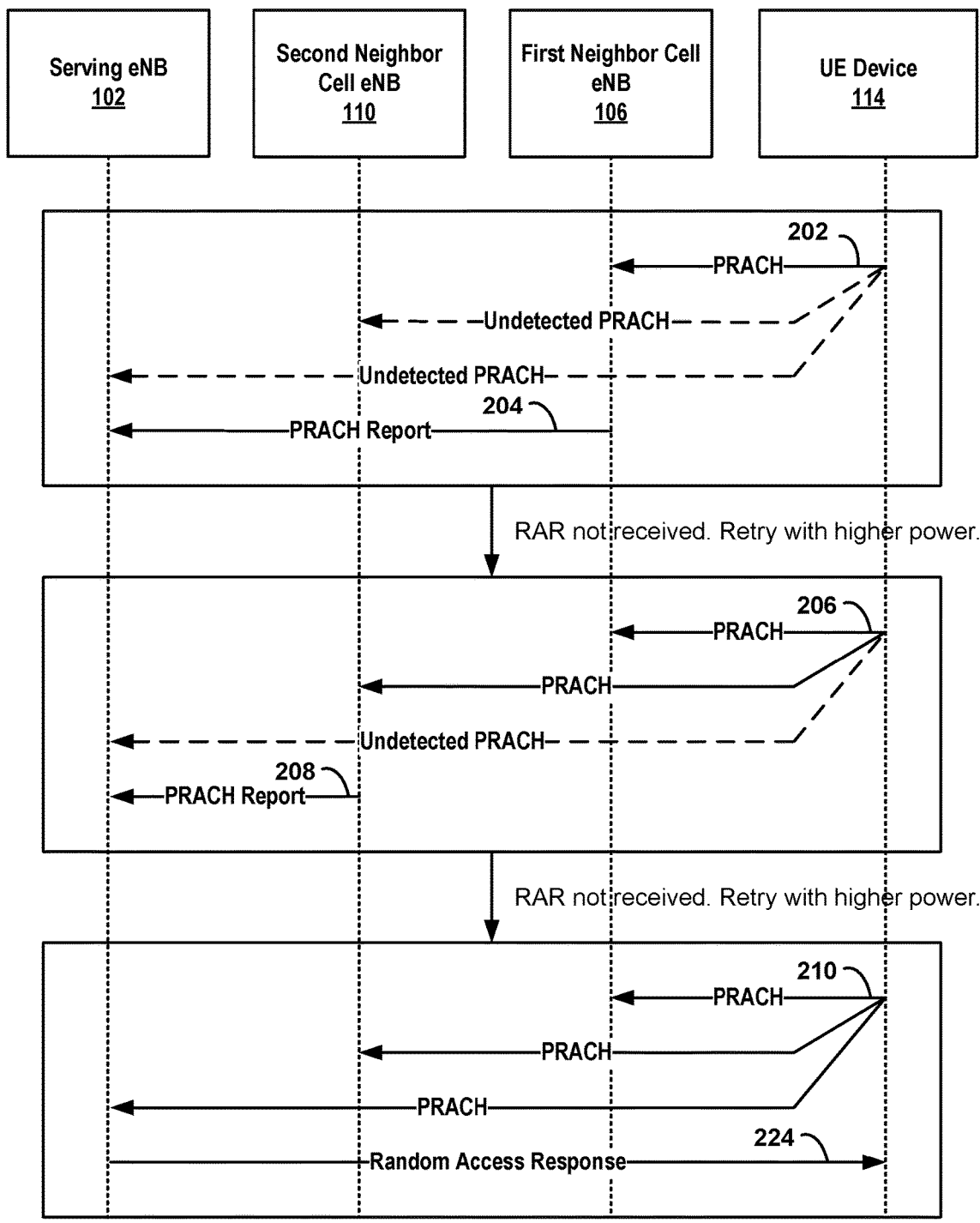
FIG. 2 is an illustration of an enhanced user equipment proximity detection procedure.

There are several techniques that can be utilized to deal with these false detections and transmission of unnecessary information reports according to the invention. For example, FIG. 2 illustrates an enhanced UE device proximity detection procedure 200 that occurs during a transmission campaign in which a UE device 114 continues sending PRACH transmissions until it receives a RAR message from the serving eNB 102. In FIG. 2, UE device 114 transmits a PRACH uplink signal three times, each with a higher transmission power than the previous transmission because the serving eNB 102 does not detect the first two PRACH transmissions. The first PRACH transmission 202 is detected by the first neighbor cell eNB 106 but is not detected by the second neighbor cell eNB 110 or the serving eNB 102. The first neighbor cell eNB 106 sends a PRACH report 204 to the serving eNB 102 that includes the information received from the preamble transmission.

The serving eNB 102 will check to see if any PRACH reports have already been received for this particular UE device 114 as a result of an earlier PRACH transmission. If the serving eNB 102 has already received prior information (e.g., prior PRACH report) pertaining to this particular UE device 114, the serving eNB 102 will discard any subsequent information (e.g., PRACH report) pertaining to this particular UE device 114. The serving eNB 102 then checks whether multiple information has been received for the same UE device 114 for the same preamble transmission but from different neighbor cell eNBs. If so, the serving eNB 102 selects the PRACH report containing the strongest signal strength associated with the preamble transmission of the UE device 114. This will correspond to the neighbor cell that is closest to the UE device 114.

Since the serving eNB 102 did not receive the first PRACH transmission 202, the UE device 114 will retransmit the preamble on the PRACH at a higher transmission power. As shown in FIG. 2, the second PRACH transmission 206 is detected by the first neighbor cell eNB 106 and the second neighbor cell eNB 110 but is not detected by the serving eNB 102. The second neighbor cell eNB 110 sends a PRACH report 208 to the serving eNB 102. Since the first neighbor cell eNB 106 has already sent a PRACH report 204 for this particular UE device 114 for this transmission campaign, the first neighbor cell eNB 106 will not send any additional information for this particular UE device 114 for the remainder of this transmission campaign.

As before, the serving eNB 102 will check to see if any PRACH reports have already been received for this particular UE device 114 as a result of an earlier PRACH transmission. Since the serving eNB 102 has already received a PRACH report 204 pertaining to this particular UE device 114, the serving eNB 102 will discard any new PRACH reports 208 pertaining to this particular UE device 114. The serving eNB 102 then checks whether multiple PRACH reports have been received for the same UE device 114 for the same preamble transmission but from different neighbor cell eNBs. If so, the serving eNB 102 selects the PRACH report containing the strongest signal strength associated with the preamble transmission of the UE device 114.

Since the serving eNB 102 did not receive the second PRACH transmission 206, the UE device 114 will retransmit the preamble on the PRACH at higher transmission power. The third PRACH transmission 210 is detected by the first neighbor cell eNB 106, the second neighbor cell eNB 110, and the serving eNB 102. The first neighbor cell eNB 106 and the second neighbor cell eNB 110 both refrain from sending a PRACH report to the serving eNB 102 since they have both previously sent a PRACH report for this particular UE device 114 earlier in the current transmission campaign. Accordingly, the serving eNB 102 sends the RAR message to the UE device 114, which terminates the procedure.

As described above, the PRACH reports 204, 208 may include a signal strength measurement value of the PRACH transmission received at the respective neighbor cell eNBs. This allows the serving eNB 102 to select which neighbor cell eNB is closest to the UE device 114, particularly in the case where more than one neighbor cell eNB detects the same PRACH transmission. Similarly, the serving eNB 102 could use the time that the PRACH report is received to determine the closest neighbor cell by selecting the PRACH report that is received first.

Figure 3:
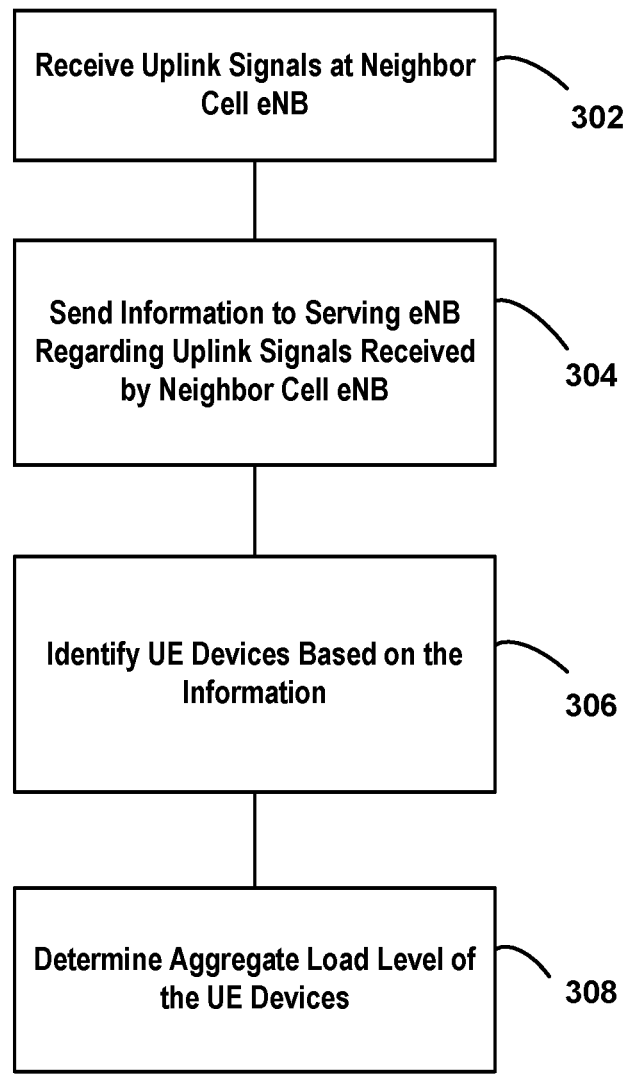
FIG. 3 is a flowchart showing a method of operating the system shown in FIG. 1.

FIG. 3 shows a flowchart of a method of identifying which UE devices 114 being served by a serving eNB 102 are near one or more neighbor cells 108, 112. The method begins at step 302, in which an uplink signal 118 transmitted from at least one of the UE devices 114 is received at a first neighbor cell eNB 106. In some instances, the uplink signal 118 received by the first neighbor cell eNB 106 is an LTE Sounding Reference Signal (SRS). In other instances, the uplink signal 118 received by the first neighbor cell eNB 106 is a preamble transmission on an LTE PRACH of the serving eNB 102.

At step 304, information 120 is sent to the serving eNB 102. The information 120 pertains to the uplink signal 118 received by the first neighbor cell eNB 106. As described above, false detections and unnecessary information reports should be prevented. One way to prevent these problems is to ensure that the information 120 is sent only once per transmission campaign by each neighbor cell eNB for each particular UE device 114. In addition, the serving eNB 102 can be configured to discard subsequent information pertaining to a particular UE device 114 if the serving eNB 102 has already received prior information 120 pertaining to that particular UE device 114.

The information 120 may also include a signal strength measurement value of the uplink signal 118 received at the first neighbor cell eNB 106. In these instances, the serving eNB 102 may receive information 120, 122 from both the first neighbor cell eNB 106 and a second neighbor cell eNB 110 pertaining to a particular UE device 114, and the serving eNB 102 can determine which of the first neighbor cell eNB 106 and the second neighbor cell eNB 110 is closer to the particular UE device 114 based on which information 120, 122 has a larger signal strength measurement value.

At step 306, one or more of the UE devices 114 is identified, based on the information 120. The method continues, at step 308, by determining an aggregate load level of the UE devices 114 that are near the first neighbor cell eNB 106 based on resource load requirements of each UE device 114 whose uplink signal 118 was received by the first neighbor cell eNB 106. Although not shown in FIG. 3, the method may additionally include determining which of a plurality of deactivated neighbor cells 108, 112 should be activated based on load levels associated with one or more UE devices 114 that are determined to be near each of the plurality of deactivated neighbor cells 108, 112. UE device load level may be based on an estimate of the aggregate load of the UE devices that have been determined to be near a neighbor cell eNB according to the resource requirements of these UE devices.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   receiving, at a neighbor cell Evolved Node B (neighbor cell eNB), an uplink signal transmitted from each of a plurality of user equipment devices (UE devices) being served by a serving eNB;
   sending, to the serving eNB, information regarding the uplink signals received by the neighbor cell eNB; and
   identifying each of the plurality of UE devices based on the information.

2. The method of claim 1, wherein the information is sent only once per transmission campaign for each UE device.

3. The method of claim 1, wherein the serving eNB discards subsequent information pertaining to a first UE device if the serving eNB has received prior information pertaining to the first UE device.

4. The method of claim 1, wherein the information includes a signal strength measurement value of the uplink signal received at the neighbor cell eNB.

5. The method of claim 4, wherein the serving eNB receives information from both a first neighbor cell eNB and a second neighbor cell eNB pertaining to a first UE device, the serving eNB determining which of the first neighbor cell eNB and the second neighbor cell eNB is closer to the first UE device based on which information has a larger signal strength measurement value.

6. The method of claim 1, further comprising:
   determining which of a plurality of deactivated neighbor cells should be activated based on aggregate load levels associated with one or more UE devices that are determined to be near each of the plurality of deactivated neighbor cells.

7. The method of claim 1, wherein the uplink signal received by the neighbor cell eNB is a Long-Term Evolution (LTE) Sounding Reference Signal (SRS).

8. The method of claim 1, wherein the uplink signal received by the neighbor cell eNB is a preamble transmission on an LTE Physical-Layer Random-Access Channel (PRACH) of the serving eNB.

9. The method of claim 1, wherein the serving eNB and the neighbor cell eNB are part of an energy savings cell configuration in which a serving cell of the serving eNB is a coverage cell and a neighbor cell provided by the neighbor cell eNB is an energy saving cell that operates at least partially within a coverage area of the coverage cell.

10. A serving Evolved Node B (serving eNB) comprising:
    a receiver configured to receive, from a neighbor cell Evolved Node B (neighbor cell eNB), information regarding uplink signals received by the neighbor cell eNB from each of a plurality of user equipment devices (UE devices) being served by the serving eNB; and
    a controller configured to identify, based on the information, each of the plurality of UE devices.

11. The serving eNB of claim 10, wherein the controller is further configured to discard information pertaining to a first UE device if the serving eNB has already received prior information pertaining to the first UE device.

12. The serving eNB of claim 10, wherein the information includes a signal strength measurement value of the uplink signal received at the neighbor cell eNB.

13. The serving eNB of claim 12, wherein the receiver is further configured to receive information from both a first neighbor cell eNB and a second neighbor cell eNB pertaining to a first UE device, the controller of the serving eNB further configured to determine which of the first neighbor cell eNB and the second neighbor cell eNB is closer to the first UE device based on which information has a larger signal strength measurement value.

14. The serving eNB of claim 10, wherein the controller is further configured to determine which of a plurality of deactivated neighbor cells should be activated based on aggregate load levels associated with one or more UE devices that are determined to be near each of the plurality of deactivated neighbor cells.

15. A neighbor cell Evolved Node B (neighbor cell eNB) comprising:
    a receiver configured to receive uplink signals transmitted from each of a plurality of user equipment devices (UE devices) being served by a serving Evolved Node B (serving eNB); and
    a transmitter configured to transmit information regarding the uplink signals received by the neighbor cell eNB to the serving eNB, the information transmitted to the serving eNB so that the serving eNB can identify each of the plurality of UE devices based on the information.

16. The neighbor cell eNB of claim 15, wherein the transmitter is further configured to transmit the information only once per transmission campaign for each UE device.

17. The neighbor cell eNB of claim 15, wherein the information includes a signal strength measurement value of the uplink signal received at the neighbor cell eNB.

18. The neighbor cell eNB of claim 15, wherein the uplink signal received by the neighbor cell eNB is a Long-Term Evolution (LTE) Sounding Reference Signal (SRS).

19. The neighbor cell eNB of claim 15, wherein the uplink signal received by the neighbor cell eNB is a preamble transmission on an LTE Physical-Layer Random-Access Channel (PRACH) of the serving eNB.

* * * * *